United States Patent [19]

Anthon et al.

[11] Patent Number: 5,182,759
[45] Date of Patent: Jan. 26, 1993

[54] APPARATUS AND METHOD FOR PUMPING OF A WEAKLY ABSORBING LASANT MATERIAL

[75] Inventors: Douglas W. Anthon; John H. Clark, both of Wheaton, Ill.; Leo Johnson, Bedminster, N.J.; Timothy J. Pier, Kenosha, Wis.

[73] Assignee: Amoco Corporation, Chicago, Ill.

[21] Appl. No.: 761,279

[22] Filed: Sep. 17, 1991

Related U.S. Application Data

[63] Continuation of Ser. No. 551,569, Jul. 11, 1990, abandoned, which is a continuation-in-part of Ser. No. 523,991, May 16, 1990, abandoned.

[51] Int. Cl.$^5$ ............................................. H01S 3/093
[52] U.S. Cl. .......................................... 372/72; 372/68; 372/69; 372/70; 372/71; 372/97; 372/107; 372/108; 372/32
[58] Field of Search ........................ 372/69, 70, 71, 72, 372/68, 102, 105, 106, 107, 108, 20, 32, 97, 66, 7, 40, 41, 25, 29

[56] References Cited

U.S. PATENT DOCUMENTS

| | | | |
|---|---|---|---|
| 3,863,177 | 1/1975 | Darmen et al. | 372/41 |
| 4,395,769 | 7/1983 | Damen et al. | 372/7 |
| 4,554,666 | 11/1985 | Altman | 372/19 |
| 4,556,979 | 12/1985 | Scott et al. | 372/20 |
| 4,592,058 | 5/1986 | Mongeon et al. | 372/32 |
| 4,764,930 | 8/1988 | Bille et al. | 372/23 |
| 4,791,644 | 12/1988 | Dubé372 | 3/ |
| 4,942,586 | 7/1990 | Lui | 372/68 |

*Primary Examiner*—Georgia Y. Epps
*Attorney, Agent, or Firm*—Amoco Corp.

[57] ABSTRACT

A laser apparatus and method is disclosed comprising a first lasant material which is located in an optical cavity and which produces laser radiation of a first wavelength, and a second lasant material which is pumped by radiation from the first lasant material, which absorbs laser radiation at the first wavelength in an amount generally comparable to the Optimum Output Coupling, which functions as the output coupler for the optical cavity and which lases at a second wavelength. The first lasant material and the second lasant material are preferably selected to have minimal losses such that there is a net gain in the cavity.

35 Claims, 3 Drawing Sheets

APPARATUS AND METHOD FOR PUMPING OF A WEAKLY ABSORBING LASANT MATERIAL

RELATION TO OTHER APPLICATIONS

This application is a continuation of a U.S. patent application (now abandoned) having a serial number of 551,569 and filed on Jul. 11, 1990 which is a continuation-in-part of a U.S. patent application (now abandoned) having a serial number of 523,991 and filed on May 16, 1990.

TECHNICAL FIELD

This invention relates to the general subject of solid-state lasers and, in particular, to a laser system and method wherein a weakly absorbing lasant material is pumped by another laser and used as the output coupler.

BACKGROUND OF THE INVENTION

When one solid-state laser is used to pump another solid-state laser, it is important, for efficient operation, that essentially all the pump photons be absorbed by the second laser material. This is conventionally achieved by making the laser material long enough such that more than 90% of the light at the pump wavelength is absorbed in a single pass through the material. This is not always practical with weakly absorbing materials (i.e., those materials where the absorption is only a few percent per centimeter). Sufficiently large pieces of the laser material may be unobtainable of the losses introduced by the long laser rod may be unacceptable. Simple techniques for increasing the material absorption (e.g., increasing the active ion concentration) are usually not feasible, since they usually have unacceptable physical consequences, such as reductions in the excited state lifetime. Thus, alternative techniques for efficiently pumping these weakly absorbing materials are desirable.

The potential medical uses for 3 $\mu$m lasers has spurred a search for efficient high power solid-state sources. For example, holmium laser operation has been demonstrated using flashlamp pumping in a number of different hosts. The lowest thresholds have been observed using holmium doped yttrium aluminum perovskite (YAlO$_3$) or Ho:YAP. Emission in Ho:YAP has been reported at 2.92 $\mu$m and 3.02 $\mu$m on the $^5I_6 \rightarrow {}^5I_7$ transition.

Intracavity laser pumping, using the 1.08 $\mu$m line of a Nd:YAP laser to pump a Ho:YAP rod has been reported. S. R. Bowman, W. S. Rabinovich, A. P. Bowman and B. J. Feldman, "Laser Pumped 3 $\mu$m Ho:YAlO$_3$ Laser, " Annual Meeting of Optical Society of America, Session TU04, Oct. 16, 1989. Specifically, a Ho:YAP rod was placed inside the cavity of a flashlamp pumped Nd:YAP laser whose cavity losses, aside from the rod, were low. Since the rod was the dominant loss in the Nd:YAP cavity, it absorbed most of the pump light after many passes. A separate cavity, in and oriented at a slight angle from the axis of the 1.08 $\mu$m Nd:YAP laser cavity, was used to contain the Ho:YAP rod. Emission was observed at 2.92 $\mu$m as well as at a new line at 2.85 $\mu$m. The 2.85 $\mu$m line was extremely sensitive to atmospheric water absorption and rankle only when the laser was purged with dry nitrogen. In a nonoptimized cavity, slope efficiencies of about 4% were observed relative to the 1.08 $\mu$m pump and a maximum output energy of 8 mJ was observed.

The physical size of the Bowman et al. system is relatively large (e.g., a 6.3 mm by 75 mm holmium doped laser rod). High power densities were required and, because of the geometry, the Ho:YAP host material was not used efficiently. The thresholds were also relatively high.

Erbium is a material of practical interest since it can be used to generate optical radiation at 1.54 $\mu$m which is well into the "eye safe" region. An Yb,Er:glass laser, pumped by a flash lamp, has an energy efficiency in the range of 0.3 to 0.5 percent. By contrast, energy conversion efficiencies of erbium pumped by ytterbium, under optimum conditions, have been predicted to be in the range of 40 to 50 percent. Snitzer & Woodcock, *Applied Physics Letters*, Vol. 6, page 45 (1965). Glasses sensitized with Yb and Er and pumped by a Nd laser near 1060 nm have been studied by Gapontsev et al. and good efficiencies have been observed. Optics Comm. 46 (1983) 226. Pumping of Yb using a 860 nm diode in a fiber laser has been studied by W. L. Barnes et al. "Er$^{3+}$−Yb$^{3+}$ and Er$^{3+}$ Doped Fiber Lasers", *Journal of Lightwave Tech.*, Vol. 7, No. 10, Oct. 1989 at page 1461.

A barium-alumo-metaphosphate glass, activated with $1.5 \times 10^{21}$ cm$^{-3}$ Yb$^{3+}$ ions and $2.5 \times 10^{19}$ cm$^{-3}$ Er$^{3+}$ ions has also been studied. "Effective 1.054-1.54 $\mu$ Stimulated Emission Conversion", V. P. Gapontsev et al., *JETP Letters* (1973) 18, p. 251-253. In that study a generally rectangular active Yb$^{3+}$−Er$^{3+}$ element was used. It had a cross section of 10 mm by 14 mm and a length of 70 mm with two opposite faces inclined at 45 degrees. It was placed in a resonator comprising two active elements of LGS-40 phosphate glass in the form of generally rectangular plates which had a 10 mm by 32 mm cross section, a length of 280 mm and faces cut at the Brewster angle. The two phosphate glass elements were symmetrically arranged relative to the Yb$^{3+}$−Er$^{3+}$ element.

It would be desirable to use laser materials which are less strongly absorbing and/or much thinner than those used in a conventional extracavity system. If efficient pumping could be achieved in an intracavity geometry, many potentially valuable materials would become available for use and many of the problems associated with physically large systems would be reduced. Moreover, it would be possible to exploit the low power benefits of laser diodes.

SUMMARY OF THE INVENTION

One object of the present invention is to provide a novel laser system and method which efficiently uses a weakly absorbing material.

Another object of the invention is to provide a compact, energy efficient laser system and method which is characterized by a low threshold for excitation.

Still another object of the invention is to provide an intracavity laser system comprising two lasant materials wherein the power absorbed by the second material is comparable to the Optimum Output Coupling of the laser comprising the first lasant material.

Another object of the invention is to pump a weakly absorbing lasant material by using it as an output coupler.

Yet another object of the invention is to provide a diode pumped Nd:YAG laser which pumps a Yb sensitized Er:glass to produce 1.55 $\mu$m optical radiation using as few components as possible and using simple geometry.

In accordance with the present invention, disclosure is made of a unique laser system comprising: a laser cavity; a first lasant material which is located in the laser cavity and which is lasant at a primary laser wavelength; and a second lasant material which is pumped by optical radiation from the first lasant material, which absorbs optical radiation at the primary laser wavelength and in an amount comparable to the Optimum Output Coupling to the optical radiation from the first lasant material, which is located at least partially in the laser cavity, which functions as the output coupler of the laser cavity, and which lases at a secondary laser wavelength. Preferably the second lasant material is selected to have sufficiently low excited state absorption losses at the primary laser wavelength, such that there is a net gain in the first laser cavity.

In one preferred embodiment of the invention, a submillimeter plate of an Yb,Er:phosphate glass is pumped by a Nd:YAG laser source which is pumped by a laser diode operating at about 800 nm. The plate is located to receive on one side (i.e., the input side) the output of the Nd:YAG laser and is coated on the opposite side (i.e., the side farthest from the Nd:YAG laser or the output side) for high reflection at the lasant wavelength of the Nd:YAG laser (e.g., about 1060 nm). The input side is also coated for high reflection at about 1.5 microns. Thus, the plate is located in the laser cavity of the Nd:YAG and in its own laser cavity.

The practice of intracavity pumping in accordance with the present invention has great potential as a means for expanding the number of laser systems which can be used with laser diode pumping. It is generally applicable to any three level laser process. It also makes it reasonable to consider the use of such difficult systems as three level lasers or up-conversion lasers. Those skilled in the art will readily appreciate the many desirable and commercially important features of such a laser.

Numerous other advantages and features of the present invention will become readily apparent from the following detailed description of the invention, the embodiments described therein, from the claims, and from the accompanying drawings.

DETAILED DESCRIPTION

While this invention is susceptible of embodiment in many different forms, there is shown in the drawings and will herein be described in detail several specific embodiments of the invention. It should be understood, however, that the present disclosure is to be considered an exemplification of the principles of the invention and is not intended to limit the invention to specific embodiments illustrated.

The use of flashlamps, light-emitting diodes (as used herein, this term includes superluminescent diodes and superluminescent diode arrays) and laser diodes (as used herein, this term includes laser diode arrays) to optically pump or excite a solid lasant material is well-known. Conventional light-emitting diodes and laser diodes are now available which, as a function of composition, produce output radiation having a wavelength over the range from about 630 nm to about 1600 nm. Any such device, which produces optical pumping radiation of a wavelength effective to pump a lasant material, can be used in the practice of this invention. For example, the wavelength of the output radiation from a GaInP based device can be varied from about 630 to about 700 nm by variation of the device's composition. Similarly, the wavelength of the output radiation from a GaAlAs based device can be varied from about 750 nm to about 900 nm by variation of the device's composition. InGaAlP based devices can be used to provide radiation in the wavelength range from about 1000 to about 1600 nm using similar methods.

In accordance with the present invention, an apparatus and method is disclosed for using one solid state laser (i.e., the first laser or the pumping laser) to efficiently pump a second solid state lasant material in a configuration where the second solid state lasant material is located inside the cavity of the first laser. In this arrangement, the pumped laser power, which is absorbed by the lasant material of the second laser, constitutes the output coupling of the pumping laser; preferably, the pumped laser power should be set equal to the Optimum Output Coupling of the pumping laser. For a first laser comprising a diode-pumped Nd:YAG laser, for example, the Optimum Output Coupling is typically a few percent. This corresponds to an absorption in the second lasant material which is much weaker than that which is conventional (i.e., where it is desirable to have absorptions in the second solid state lasant material of 90 percent or more).

In particular, a second laser, using a lasant material or gain medium which has absorptions near the Neodymium (Nd) laser transitions at about 946 nm, 1064 nm and 1320 nm, can be efficiently pumped by the first laser in accordance with the principles of the present invention. Such lasant materials include a variety of Ytterbium ($Yb^{3+}$) sensitized materials which lase in the visible and infrared, as well as Erbium ($Er^{3+}$), Holmium ($Ho^{3+}$), Praseodymium ($Pr^{3+}$) and Thulium ($Tm^{3+}$) containing materials. In the case where the pumped absorption is relatively strong (e.g., Yb at 946 nm), the use of very thin lasant materials for the second laser is practical. This corresponds to extremely high excitation densities which can be very beneficial in cases such as three-level lasers or up-conversion lasers, where a high excitation density is necessary for efficient operation. In addition, the pumping is exceptionally uniform, since the intensity of the pumping beam is almost unchanged throughout the second lasant material.

The second lasant material can be made to lase in a second cavity which can either be: (1) defined in part by the optics used for the pumping laser; or (2) in a separate physical structure. The second case is more general, but requires some method for separating the two wavelengths and necessitates the alignment of two cavities. The first case results in some very significant reductions in the complexity of the system, but requires that the two laser materials be spectroscopically compatible.

INTRACAVITY PUMPING

Figure 1:
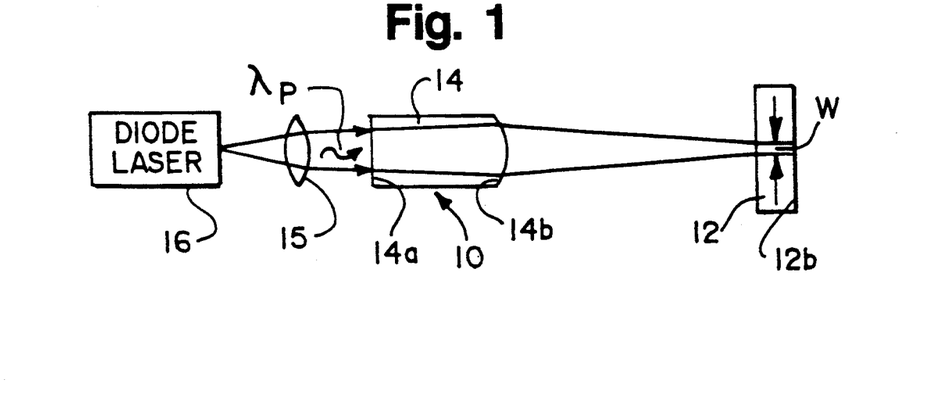
FIG. 1 is a schematic diagram of one embodiment of the present invention.

The technique of intracavity pumping, that is the subject of the present invention, is best illustrated by example. FIG. 1 shows a laser apparatus 10 comprising a Yb sensitized Er glass lasant material (alternatively referred to as the second lasant material or the glass) 12 which is pumped by radiation produced by another lasant material (alternatively referred to as the first lasant material) 14 (e.g., Nd:YLiF$_4$ or Nd:YLF) which is, in turn, optically pumped by a laser diode source 16 through optics or imaging means 15.

Laser diode means 16 can comprise one or more light-emitting diodes or laser diodes. A highly suitable laser diode source 16 comprises a gallium aluminum arsenide (GaAlAs) laser diode array, emitting light having a wavelength of about 808 nm, which is attached to a heat sink. The heat sink can be passive in character; however, the heat sink can also comprise a thermoelectric cooler to help maintain the laser diode array at a constant temperature and thereby ensure optimal operation of the laser diode array at a constant wavelength.

It will be appreciated that, during operation, the laser diode source 16 is attached to a suitable power supply. For simplicity, electrical leads from laser diode array which are directed to a power supply and other conventional components are not illustrated in the drawings.

The optics 15 serves to focus pumping radiation into the first lasant material 14. This focusing results in a high pumping intensity and an associated high photon conversion efficiency in the two lasant materials 12 and 14. The optics 15 can comprise any conventional means for focusing light, such as a gradient index (GRIN) lens, a ball lens, an aspheric lens or a combination of lenses. Although the use of conventional optics 15 is depicted, it will be appreciated that conventional optics is not an essential element of the invention, and that functional equivalents may be used.

If a laser diode is used as a laser diode source 16, the output face or end of the laser diode source can be placed in a butt-coupled relationship to input surface of the first lasant material 14 without the use of optics 15. As used herein, "butt-coupled" is defined to mean a coupling which is sufficiently close such that a divergent beam of optical pumping radiation, emanating from laser diode source 16, will optically pump a mode volume within the first lasant material 14 with a sufficiently small transverse cross-sectional area so as to support essentially only single transverse mode laser operation (i.e., TEM$_{00}$ mode operation) in the lasant material.)

Suitable first lasant material 14 include, but are not limited to, solids selected from the group consisting of glassy and crystalline host materials which are doped with an active material and substances wherein the active material is a stoichiometric component of the lasant material. Highly suitable active materials include, but are not limited to, ions of chromium, titanium and the rare earth metals. Highly suitable lasant materials 14 include: neodymium-doped YAG (i.e., yttrium aluminum garnet or Y$_3$Al$_5$O$_{12}$) or Nd:YAG; neodymium-doped YAlO$_3$ or Nd:YAP; neodymium-doped YLiF$_4$ (YLF), neodymium-doped Gd$_3$Ga$_5$O$_{12}$ (GGG); neodymium-doped Gd$_3$Sc$_2$Ga$_3$O$_{12}$ (GSGG) or Gd$_3$Sc$_2$Al$_3$O$_{12}$ (GSAG), neodymium pentaphosphate, neodymium aluminum borate (NAB) and lithium neodymium tetraphosphate (LNP).

By way of a specific example, neodymium-doped YAG is a highly suitable first lasant material 14 for use in combination with a laser diode source 16 which produces light having a wavelength of about 808 nm. When pumped with light of this wavelength, neodymium-doped YAG can emit light having a wavelength of either about 1064 nm or about 1320 nm.

Simultaneous operation of two lasant materials in the same cavity is facilitated when: (1) the pumping laser material 14 is essentially transparent at the wavelength emitted by the pumped lasant material 12; (2) the absorption in the pumped lasant material 12, at a pumping wavelength, is preferably comparable to or essentially equal to the optimal output coupling of the pumping laser 14; and (3) there are no significant additional losses at either lasing wavelength (e.g., those due to Excited-State Absorption or ESA) in either lasant material.

Specifically, FIG. 1 illustrates a first lasant material 14 in the form of a Nd:YLF laser plano-convex rod which is pumped by a laser diode source 16 at 792 nm through optics 15. One end 14a (i.e., here the left hand end or flat end) of the rod 14 is coated for high reflection (HR) at 1047 nm and at 1540 nm, and for high transmission (HT) at 792 nm; the right hand end or curved end 14b is anti-reflection (AR) coated for 1047 nm and 1540 nm. The radius of the curved end 14b was chosen at 10 mm so that, when combined with a mirrored surface 12b, a laser cavity is formed having a mode with roughly 100 μm radius. The rod length was about 3 mm.

Opposite to the curved end 14b is located the second lasant material 12 in the form of a piece of erbium-ytterbium phosphate glass which is about 0.7 mm in thickness and is AR coated on the adjacent or inner face for 1047 nm and 1540 nm. The glass lasant material 12 could also be uncoated and oriented at the Brewster angle relative to the longitudinal axis of the cavity, or it could be inserted uncoated as a normal incidence etalon; these expedients could avoid the use of some relatively difficult two-color or dichroic coatings.

The thickness and ytterbium concentration of the glass lasant material 12 are chosen so that the round trip absorption at 1047 nm will be roughly 2%. Those skilled in the art will recognize that a loss of this magnitude is what is required to achieve Optimum Output Coupling of a Nd:YLF laser 14. The wavelength dependence of this absorption loss could be enough to force the neodymium laser 14 into operation at a longer wavelength transition. In Nd:YLF, these tansitions are near 1071 nm, where there is still appreciable Yb absorption. Some adjustment in the length of the glass may be required to re-optimize the pumping at this wavelength. An optimally output coupled 1047 nm laser 14, pumped with a 200 mW laser diode source 16, typically produces 50 mW; a similar amount of power will be coupled into the glass lasant material 12. Combining this with the erbium lifetime of about 8 msec, a mode radius of 100 μm and with a path length of about 1 mm in a glass lasant material 12, the absorbed energy is about 13 J-cm$^{-3}$ which corresponds to excited density of $7 \times 10^{19}$ atoms-cm$^{-3}$. This corresponds to the total erbium atom density of 0.7% erbium. This has proven to be enough to ensure population inversion at the 0.3% to 0.5% erbium concentrations typically used in such glasses. Reducing the beam diameter can give even larger pumping densities.

The gain in the second lasant material 12 in this situation is relatively small. The round trip gain for a fully inverted population in a 1 mm thickness of 0.7% erbium glass 12 would only be about 10%. Because of saturation, bleaching and up-conversion effects, the actual achievable inversion will be somewhat lower. A. G. Murzin et al., "Some Features of Laser Excitation of Ytterbium-Erbium Glasses", *Sov. J. Quantum Electronics*, 15(3), March 1985. Thus, the laser system must be designed to work with gains of only a few percent in the second lasant material 12. The gain can be increased by increasing both the pumping intensity and the number of erbium atoms in the beam. Some adjustment of the erbium concentration and sample length may be required to find the optimum performance for a given pump intensity. However, one of the biggest difficulties in aligning a low gain laser has been eliminated in this design. Because the two lasers share the same cavity and are co-axially aligned, the erbium laser 12 is automatically aligned with its pumping laser 14.

The right hand or exterior surface 12b of the glass 12 forms a mirror or reflecting means. In a laser system running at both wavelengths, this could simply be a flat mirror coated for high reflectivity at 1047 nm, and for some transmission at about 1540 nm. This will give a continuous wave (CW) output at about 1540 nm.

A highly satisfactory Er glass laser material 12 is a phosphate glass with an Yb concentration of $1.5 \times 10^{21}$ cm$^{-3}$ and an Er concentration of $5.0 \times 10^{19}$ cm$^{-3}$. This material works as a three-level laser at the "eye-safe" wavelength of 1540 nm. There is weak absorption in such glasses at the 1047 nm operating wavelength of the Nd:YLF laser 14 due to the long wavelength tail of the Yb absorption. Typical absorption coefficients at Nd laser wavelengths are: 0.070 cm$^{-1}$ at 1047 nm; and 0.020 cm$^{-1}$ at 1064 nm. A variety of similar glasses are commercially available and have similar properties.

The apparatus 10 shown in FIG. 1 uses the Yb absorption in the glass 12 as the output coupling of the Nd:YLF laser 14. In the case of a CW Nd:YLF laser pumped with a few hundred milliwatts from a laser diode source 16, those skilled in the art will recognize that the Optimum Output Coupling is comparable to or about 1%. Placing a 0.72 mm thick piece of the above-described Yb,Er:glass 12 in the cavity will result in an absorption equivalent to this coupling. The required thickness of the lasant material or secondary absorber 12 will vary with the details of the glass composition and the choice of Nd laser host 14. With the above-described Yb,Er:glass 12 and with a 1064 nm Nd:YAG laser 14, a piece of phosphate glass, which is about 2.5 mm in thickness, would be required to achieve the same effect. Other glasses with higher Yb concentrations (and shorter absorption depths) exist. Because of the saturation effects discussed below or the wavelength shift of the Nd laser to operate at higher wavelengths (i.e., due to the Yb absorption), the actual optimal glass thickness may vary somewhat.

Those skilled in the art will appreciate that, because an Er laser is essentially a three-level laser, it is not ordinarily considered as a candidate for laser diode pumping. However, the intracavity pumping geometry described here is especially favorable for this type of system because of the efficiency with which a very small volume of active material can be excited. Pulled to near its unstable point, the cavity shown in FIG. 1 will exhibit a $1/e^2$ beam waist "w" of 40 $\mu$m in the glass lasant material 12. This gives a pump density of about 80 J/cm$^3$. This is large enough to ensure efficient CW operation.

In actual operation it is expected that some bleaching will occur in the glass so that a steady state absorbance will be achieved. The optimal glass thickness will be that which gives a partially saturated absorbance equal to the Optimum Output Coupling. In practice, this means that some empirical variation of the glass thickness and output coupling may be necessary to achieve optimum CW performance.

FIG. 1 shows a system in which the first laser 14 and the second laser 12 share the same cavity. This works best if the pumping lasant host material of the first laser 14 is transparent at the wavelength at which the second laser operates. This is not automatically true for all Nd-containing first lasant material 14 at about 1540 nm. In many host materials, the highest energy transitions of the $^4I_{9/2} \rightarrow ^4I_{15/2}$ absorption band occur near this wavelength. However, several hosts exist which have a short-wavelength absorption edge beyond this wavelength. These include Nd:YVO$_4$ (1582 nm absorption edge, 1065 nm lasing) and ND:YLF (1555 nm absorption edge, 1047 nm lasing). Both materials exhibit excellent diode-pumped performance.

The YLF material of the first laser 14 can be replaced by some other laser host material, such as YAG. However, YLF is preferred for two reasons. At 1047 nm, it is the shortest wavelength neodymium lasant material which is now readily available. This optimizes the overlap with the ytterbium absorption and improves the pumping efficiency of the second lasant material 12. YLF is also advantageous because it is transparent at 1.54 $\mu$m. In most other laser hosts, such as YAG, the splittings of the $^4I_{9/2}$ and $^4I_{15/2}$ levels of neodymium are such that there is some absorption at 1.54 $\mu$m; this problem is avoided in YLF. Further, there is no appreciable Excited State Absorption (ESA) in neodymium at 1.54 $\mu$m.

Finally, it should be noted that the Nd $^4I_{9/2} \rightarrow ^4I_{15/2}$ absorption bands are extremely weak in most first lasant material 14. Therefore, even in hosts with detectable absorption at 1540 nm (e.g., Nd:YAG), the absorption losses can be considerably less than the normal scattering losses in the material. This combination of materials is also favorable with respect to ESA as well.

The $^4I_{13/2} \rightarrow ^4F_{9/2}$ transition in erbium, which could conceivably cause losses at 1047 nm, appears to be at a slightly lower energy than the laser line. Similarly, the erbium emission falls between the potentially troublesome Nd $^4F_{3/2} \rightarrow ^4G_{7/2}$ and $^4F_{3/2} \rightarrow ^4G_{7/2}$ excited-state absorptions.

SEPARATED CAVITIES

Separated cavities are shown in FIG'S. 2A through 2I. The previous discussion is equally applicable with regard to: the use of a laser diode source 16 and optics 15, butt-coupling, suitable lasant materials, the sizing of the second lasant material 12 to have it absorb optical radiation in an amount comparable to the Optimum Output Coupling, the absence of significant additional losses at the wavelengths at which each material lases, the composition of the second lasant material, and the coatings applied to the ends of the first lasant material 14. When the cavities are separated, the first lasant material 14 need not be essentially transparent relative to the wavelength emitted by the second lasant material 12.

Figure 2A:
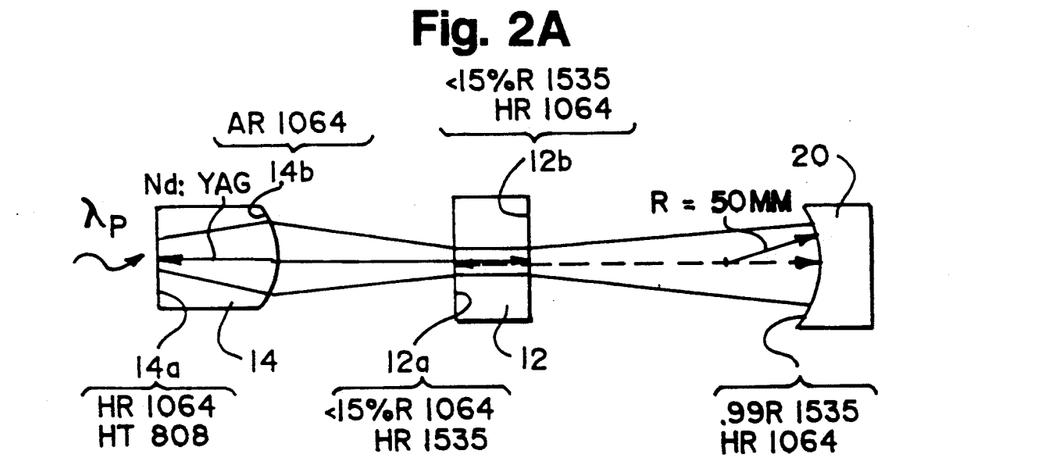
FIGS. 2A through 2H are schematic diagrams of additional embodiments of the present invention.
Figure 2B:
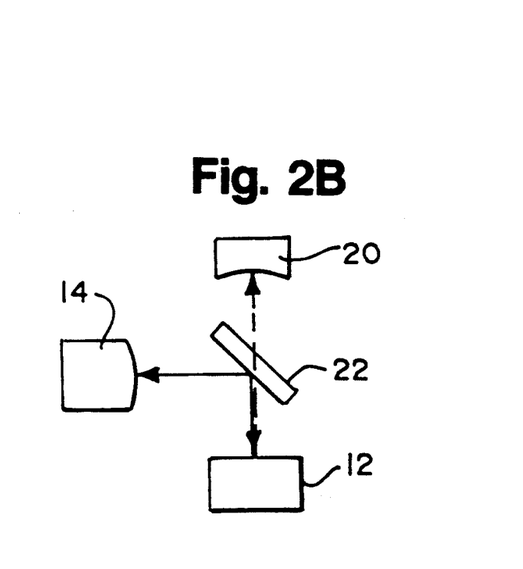

FIG'S. 2A and 2B represent two designs for separating the two laser cavities.

Turning to FIG. 2A, the left face 14a (i.e., using the orientation of the drawing) of the first lasant material 14 (e.g., Nd:YAG) is coated for HT at 808 nm and HR at 1064 nm. A laser diode source (e.g., see 15 and 16 FIG. 1) is used to pump the left face 14a of first lasant material 14 at 808 nm. The right face 14b was coated for AR at 1064 nm. The second lasant material 12 (e.g., 12%

Yb, 0.5% Er:phosphate glass) was in the form of a plane-parallel slab and was located between the first lasant material 14 and a mirror 20. The glass 12 was located in the waist (about 50 $\mu$m radius) of the diode pumped Nd:YAG laser. The glass slab 12, in one prototype system, had thickness of 1.0 mm. The side 12a adjacent to the first lasant material 14 was coated for less than 15% reflectivity at 1064 nm and HR at 1535 nm. The opposite side 12b was coated for HR at 1064 nm and for less than 15% reflectivity at 1535 nm. As such, the left face 14a of the first lasant material 14 and the right side 12b of the second lasant material form a cavity or laser resonator for the first lasant material (i.e., Nd:YAG) to lase at 1064 nm, wherein the glass 12 functions as the output coupler for the Nd:YAG laser. The mirror 20 was coated to be 99% reflective at 1535 nm and optically transmissive at 1535 nm. As such, the left hand face 12a of the glass 12 and the mirror 20 form a cavity or laser resonator for the glass to lase at 1535 nm, wherein the mirror 20 functions as the output coupler for the glass 12. Output power at 1535 nm was observed to be 90 mW for a laser diode input power of about one watt.

The apparatus of FIG. 2A has been reduced to practice using a mirror 20 and the coatings identified on the drawing. Using conventional reflective coatings, the 1064 nm reflectivity of one side 12a of the glass 12 and the 1535 nm reflectivity of the opposite side 12b can be as large as 15%. Coatings with substantially lower reflectivities are difficult to obtain, so it is important to find ways of accomodating these reflections without introducing extra losses into the 1064 nm laser or the 1535 nm laser. Parallel surfaces or faces can be used for this purpose; if the two surfaces of the erbium glass 12 are parallel to within about 30 arc seconds, the 1064 nm reflection from one side 12a of the glass 12 is collinear with that from the opposite face 12b, and the two surfaces together form a resonant reflector. The overall reflectivity at 1064 nm will be determined by the erbium glass absorption, since the only energy not reflected by the mirror 20 is that absorbed by the glass 12. The same can be said for the gain of the 1535 nm laser, including the resonant reflector consisting of the two surfaces 12a and 12b as well as the gain of the glass material 12. The system of FIG. 2A can be described as a pair of coupled "three-mirror cavities."

The output wavelength was centered at about 1535 nm within an envelope 3 nm wide and having five longitudinal modes. Stable CW operation was obtained. No spiking was observed at optimum cavity design. The thickness of the glass was about 1 mm. Overall cavity length of the prototype device was about four inches. A 0.29 pitch GRIN lens was used for the focusing optics. The curvature of the mirror 20 was 50 mm and the curvature of the emitting face 14b of first lasant material was 20 mm. The second lasant material 12 was Schott LG-750 glass having a doping of about 12.5% Yb and 0.5% Er.

The reflective coating of the mirror 20 may be modified by means of a mode selector to produce single frequency operation. This could be, for example, a metal film coating or an etalon reflector. Other mode selectors include an uncoated etalon or a Lyot filter. This is illustrated in FIG. 2H. The erbium glass 12 is then used as a Brewster plate. In addition, a piece of quartz crystal 19, several millimeters thick, is placed in the cavity at about 45 degrees to the Brewster plate axis. The quartz crystal 19 would be cut to be a full-wave plate at both 1047 nm and 1540 nm. If the cavity is short enough (i.e., the modes are far enough apart), this will cause single mode operation at one or both wavelengths. A quartz crystal can also be used as a Brewster plate; this would function as a conventional birefringent filter, like that normally used in a dye laser.

Alternative embodiments of the subject invention are set forth in FIGS. 2B through 2H. In each instance, the optical path of the laser utilizing lasant material 14 is identified by a solid line. In FIG. 2B, a dichroic reflector 22 is used to separate the two lasant frequencies. The configuration in FIG. 2B will also work if a dielectric polarizer is used in place of the dichroic reflector 22.

Alternative methods for separating the laser light from the two lasant materials 14 and 12 use either wavelength or polarization. These methods are shown in FIGS. 2C through 2G. These methods do not have the simplicity of the those previously described; however, low-loss cavities can be produced.

Figure 2C:
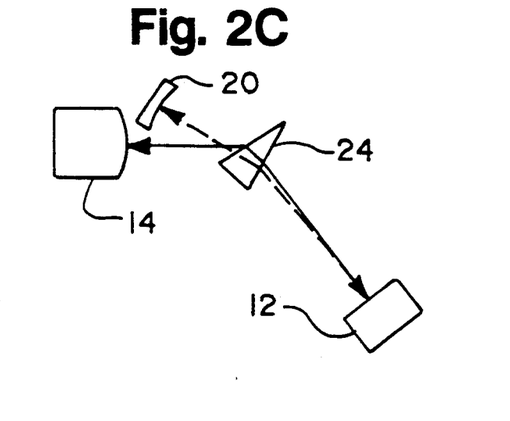

More specifically, in FIG. 2C, a prism 24, such as a Brewster Prism, is used to separate the two beams by wavelength. This will work especially well if the two lasers operate at widely spaced wavelengths and give output beams with the same polarization. The pumping laser cavity (i.e., whose optical path is identified by a solid line) may be somewhat difficult to align in this arrangement since the cavity alignment is wavelength dependent. This may actually be an advantage in some cases, since it makes it possible to tune the pumping laser to wavelengths other than the strongest transition.

Figure 2D:
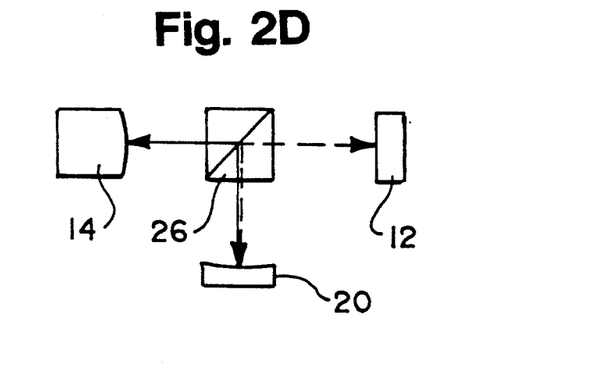
Figure 2E:
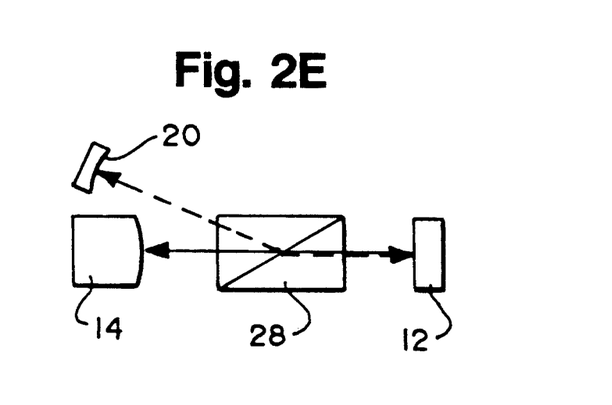

FIGS. 2D and 2E illustrate the use of different types of polarizing prisms to separate the beams of the two lasers. In FIG. 2D a Glan Prism 26 is used; in FIG. 2E a Wollaston Prism 28 is used. These designs are relatively simple, but obtaining low-loss prisms may be difficult using present day technology.

Figure 2F:
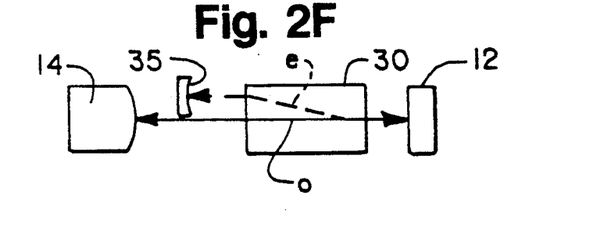
Figure 2G:
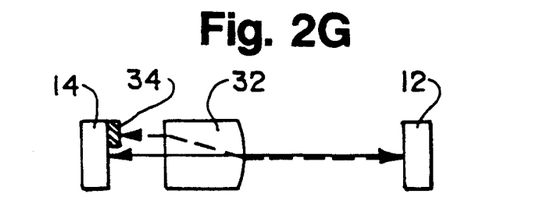
Figure 2H:
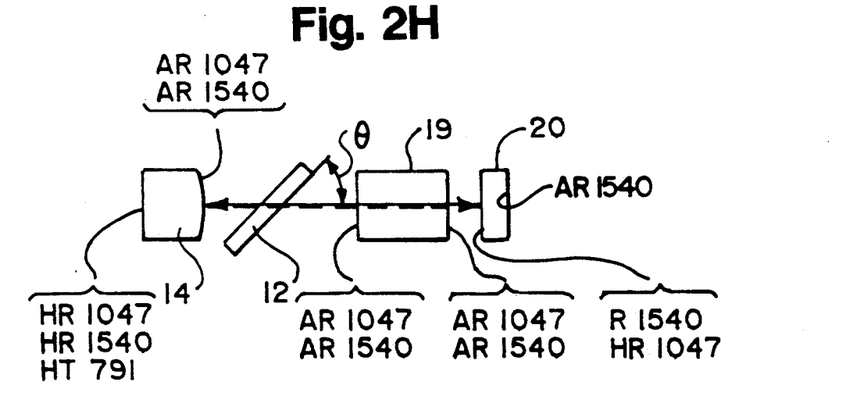

In FIGS. 2F and 2G, the "walk-off" between polarizations in a birefringent crystal 30 and 32, respectively, is used to separate the two laser beams. Although this is a simple and low loss technique, it may closely restrict the placement of components.

In FIG. 2F the "walk-off" of the ordinary "o" and extraordinary "e" rays from the birefringent quartz 30 are depicted. There, the extraordinary ray "e" is reflected between a mirror 35 which is displaced from the axis of the laser.

The system depicted in FIG. 2G uses a curved piece of calcite 32 in conjunction with a flat parallel piece of Nd:YLF 14 having a spatially varying coating 34 on the front surface. One way to make such a piece is to apply a reflective coating to a suitably masked AR coated piece of Nd:YLF. The curvature on the calcite is positioned so that the two beam waists in the glass 12 will automatically be aligned. In this respect the cavity of FIG. 2G is closely related to that illustrated in FIG. 1. Once the pumping laser has been made to work in this cavity, it is only necessary to translate the first lasant material 14 (e.g., Nd:YLF) until the correct surfaces are aligned with each laser beam path to obtain two-frequency operation.

Generally speaking, the techniques of FIGS. 2A through 2G are relatively more difficult to align than is the single cavity technique which is illustrated in FIG. 1. One special advantage is that the problem of excited state absorption in the erbium is avoided, relative to the case where a laser diode is used directly for pumping the erbium. In these cases it is necessary to overlap the second laser mode volume with the pumped spot in the second laser host material. However, this is no more difficult than aligning a typical laser-diode pumped solid-state laser, except in systems with large losses in the unpumped regions. In these cases, it is important to have good mode overlap between the two lasers.

Figure 3:
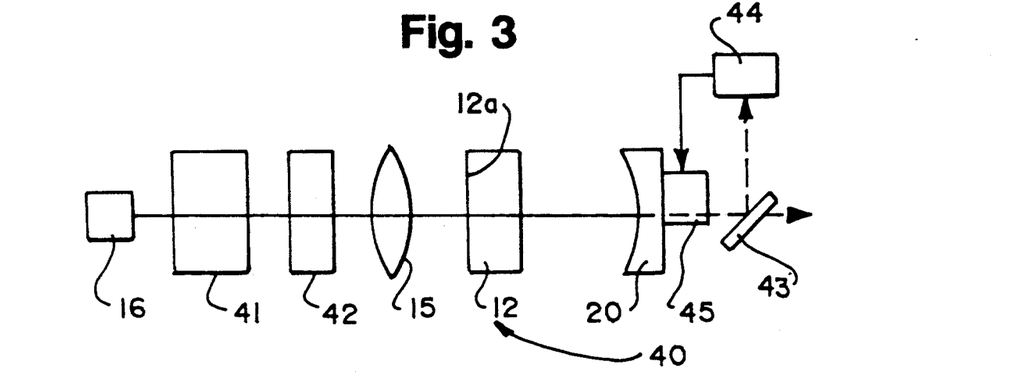
FIG. 3 is still another embodiment of the present invention.

Turning to FIG. 3, still another laser system is illustrated. That system comprises an external or first laser 41, an isolator 42, optics 15, and a reflective coating 12a and mirror 20 which form a laser cavity or resonator for the lasant material 12 to lase at an output wavelength.

The first laser 41 is adjusted to operate on a single longitudinal mode. The first laser 41 can, for example, be a laser diode or a diode pumped, solid state laser. In the embodiment illustrated, the output of the first laser 41 is directed through the isolator 42 and into a suitable set of mode-matching optics 15. The purpose of the optics 15 is to ensure good spatial overlap of the injected laser beam and the fundamental spatial mode of the cavity formed by the reflective coating 12a and mirror 20. By adjusting the length of the cavity with a piezoelectric transducer 45 (controlled via feedback from a beamsplitter 43 and control electronics 44), the cavity can be brought into resonance with the injected laser beam. This results in an intracavity intensity comparable to or greater than that inside the external laser's 41 cavity.

Other techniques for making these adjustments to achieve resonance include those discussed in conjunction with extracavity resonant doubling, including electro-optic adjustment of the cavity length and the use of the external cavity to injection stabilize the laser. The problem of injecting signals into a resonator is discussed by Siegman in his textbook *Lasers*, 1988.

The output coupling of the external resonator is provided, as before, by the absorber 12 (e.g., a piece of ytterbium sensitized erbium-doped phosphate glass). The reflecting coating 12a and mirror 20 are reflective for the laser wavelength (e.g., 1.54 μm) of the material 12. The requirements for mirror 20 and coating 12a which form the cavity are similar to those for the two-laser cavity embodiments previously described.

The main advantage of using the apparatus of FIG. 3 is that interactions between the pumping laser and the intracavity loss are minimized. The pumping laser can be arranged for optimum performance; for example, large output couplings or lossy intracavity elements, like Lyot filters (e.g., see FIG. 2H), can be added to achieve efficient single frequency operation. The resonator formed by the mirror 20 and reflective coating 12a can then be separately optimized to suit the desired process.

It should be understood that the conditions for efficient mode coupling are somewhat restrictive and require much more exacting adjustment than is needed for a simple intracavity scheme. Thus, the external resonant laser systems are typically less robust than an intracavity pumped laser system.

However, there are cases where intracavity pumping is not practical (i.e., when a semiconductor laser is used for the pump beam). In these cases, it may be beneficial to use the apparatus of FIG. 3. Simple intracavity doubling is practically impossible using just a diode laser as the pump laser (i.e., because the intrinsic losses in the gain medium prevent the buildup of large intracavity fields). An external cavity provides a means for achieving large intracavity intensities despite the losses.

The technique of intracavity pumping described here is conceptually similar to that of intracavity doubling. In both cases, a relatively weak interaction is efficiently exploited by means of the large optical intensities found in a laser cavity. The intracavity doubling process is complicated by the fact that doubling is a phase-sensitive process. Unusual feedback effects and instabilities can occur because of optical parametric processes which convert the second harmonic radiation back into the fundamental. These processes do not occur in the case of a weakly absorbing material, and the instabilities and noise, which plague intracavity doubled devices, do not occur.

From the foregoing description, it will be observed that numerous variations, alternatives and modifications will be apparent to those skilled in the art. Accordingly, this description is to be construed as illustrative only and is for the purpose of teaching those skilled in the art the manner of carrying out the invention. Various changes may be made (e.g., moving rod geometries), materials substituted (e.g., borosilicate glasses) and features of the invention may be utilized. For example, up-conversion lasers, which use Yb to sensitize visible emission from Er, Ho and Tm, can be used. The same cavity shown in FIG. 1 can be used for this purpose since Nd:YLF is relatively transparent at both the 551.5 nm Ho transition and at the 670.9 nm erbium line. However, it is by no means certain that ground-state or excited-state absorption will not prevent one or more of these lasers from working. In that event, one of the cavities shown in FIGS. 2A through 2G may be more useful.

As another example a single-plate birefringent filter may be used in the intracavity situation (e.g., FIG. 2A) to produce tunable single frequency operation (e.g., 1535 nm to 1570 nm).

The lasers shown in FIGS. 2A through 2H can be modified in a variety of ways without affecting the pumping geometry. For example, by placing additional elements in the laser cavities, it would be possible to Q-switch, mode-lock, mode select or intracavity-double the lasers shown. It should also be understood that the embodiments previously discussed have different advantages when so modified. For example, the cavity shown in FIG. 2A would not be well-suited to modelocking because of the etalon effects associated with parallel faces of the laser rod. A Q-switched version of the cavity shown in FIG. 2A has been reduced to practice using a simple chopper-wheel Q-switch which intersected the beam near the surface 12b. In another experiment, a 2 nm glass rod 12 was used with an acousto-optic Q-switch. 20 μJ, 20 nsec pulses at 800 Hz were obtained for an average power of 16 mW. CW power was 35 mW.

Thus, it will be appreciated that various modifications, alternatives, variations, etc., may be made without departing from the spirit and scope of the invention as defined in the appended claims. It is, of course, intended to cover by the appended claims all such modifications involved within the scope of the claims.

We claim:
1. A laser apparatus, comprising:
  a) a first laser cavity;
  b) a first lasant material which is located in said first laser cavity to produce optical radiation at least at a primary laser wavelength; and
  c) a second lasant material which is optically pumped by said optical radiation from said first lasant material, which absorbs optical radiation at said primary laser wavelength in an amount to achieve Optimum

Output Coupling to said optical radiation from said first lasant material, which is at least partially located in said first laser cavity, which functions as the output coupler of said first laser cavity, and which lases at a secondary laser wavelength, said second lasant material being selected to have sufficiently low excited-state absorption losses at said primary wavelength such that there is a net gain in said first laser cavity.

2. The apparatus of claim 1, wherein said second lasant material is entirely in said first laser cavity; and wherein said first lasant material is selected to be essentially transparent at said secondary laser wavelength.

3. The apparatus of claim 1, wherein said first lasant material is selected from those materials which are capable of being pumped by laser diode pumping means.

4. The apparatus of claim 1, further including a second laser cavity which is resonant at said second wavelength and which is generally colinear with said first laser cavity; and wherein said second lasant material is located in said first laser cavity and in said second laser cavity.

5. The apparatus of claim 4, wherein said second lasant material comprises a rare earth sensitized glass which has a thickness of less than 10 mm and which has two opposite faces, one of said faces carrying coating means for high transmission at said primary laser wavelength and high reflection at said secondary laser wavelength, the opposite face carrying coating means for high transmission at said secondary laser wavelength and high reflection at said primary laser wavelength, said one face forming part of said second laser cavity and said opposite face forming part of said first laser cavity.

6. The apparatus of claim 1, wherein said second lasant material comprises a sensitized glass which comprises from 0.01% to 15% by weight of ytterbium and from 0.01% to 1.0% by weight of a material selected from the group consisting of erbium, holmium and thulium.

7. The apparatus of claim 1, wherein said second lasant material is located in said first laser cavity and in a second laser cavity and is pumpingly coupled to said first laser cavity using wavelength separation means for separating optical radiation at said primary wavelength from optical radiation at said secondary wavelength as a function of the wavelength of said optical radiation.

8. The apparatus of claim 7, wherein said wavelength separation means is selected from the group consisting of dichroic reflector means and refractive prism means.

9. The apparatus of claim 1, wherein said second lasant material is located in said first laser cavity and in a second laser cavity and is pumpingly coupled to said first laser cavity using polarization separation means for separating optical radiation at said primary wavelength from optical radiation at said secondary wavelength as a function of the polarization of said optical radiation.

10. The apparatus of claim 9, wherein said polarization separation means is selected from the group consisting of dielectric polarizer means, Glam prism means, Brewster prism means and Wollaston prism means.

11. The apparatus of claim 1, wherein said second lasant material is located in said first laser cavity and in a second laser cavity and is pumpingly coupled to said optical radiation at said primary laser wavelength using birefringent crystal means, located in said first laser cavity and in said second laser cavity, for substantially separating optical radiation at said secondary laser wavelength from optical radiation at said primary laser wavelength.

12. The apparatus of claim 11, wherein said first laser cavity comprises a mirror; wherein said second lasant material is located between said mirror and said first lasant material; wherein said second laser cavity comprises spatially varying coating means, carried by said first lasant material, for high reflection at said secondary laser wavelength; and wherein said birefringent crystal means is located between said second lasant material and said spatially varying coating means and is positioned to produce a laser beam which is at said secondary laser wavelength and which is between said mirror and said spatially varying coating means.

13. The apparatus of claim 11, wherein said first laser cavity comprises light reflection means; wherein said second lasant material is located between said light reflection means and said first lasant material; wherein said second laser cavity comprises a mirror which faces said light reflection means; wherein said birefringent crystal means is positioned between said mirror and said light reflection means to polarize said optical radiation at said primary laser wavelength at one of the two ordinary and extraordinary rays which are formed when light at said primary laser wavelength passes through said birefringent crystal means and to polarize said optical radiation at said secondary laser wavelength at the other of said two ordinary and extraordinary rays; and wherein said birefringent crystal means is positioned to have said optical radiation at said secondary laser wavelength light reflect off said mirror.

14. The apparatus of claim 11, wherein said birefringent crystal means is selected from the group consisting of calcite, $LiNbO_3$ and $TiO_2$.

15. A laser system, comprising:
a) first laser means comprising a first optical cavity and a first lasant material which is located in said first optical cavity and which when pumped by diode laser pumping means produces laser light of a first wavelength along an optical path;
b) an etalon which is at least partially located in said first optical cavity, which is formed from a sensitized second lasant material of sufficient thickness to absorb said laser light from said first lasant material to achieve Optimum Output Coupling with said first laser means and to function as the output coupler for said first laser means, which has one face to receive said light from said first laser means, and which has an opposite face, said faces lying generally perpendicular to said optical path; and
c) cavity means, having an axis which is generally coaxial with said optical path, for forming at least part of a laser cavity for said sensitized second lasant material to lase at a second wavelength, said first lasant material being selected to have sufficiently low absorption losses at said second wavelength and said second lasant material being selected to have sufficiently low absorption losses at said first wavelength such that there is a net gain in said first lasant material and in said second lasant material.

16. The system of claim 15, wherein said sensitized second lasant material is a Yb sensitized Er glass; wherein said etalon is 10 mm or less in thickness; and wherein said first optical cavity and said laser cavity are generally colinear.

17. The system of claim 16, wherein said etalon is located in said first optical cavity and in said laser cavity; and wherein said cavity means comprises a coating on said one face of said etalon for high reflection at said second wavelength and for high transmission at said first wavelength.

18. The system of claim 16, wherein said opposite face of the etalon is coated for high reflection at said first wavelength and for high transmission at said second wavelength; and wherein said cavity means further comprises a mirror for reflecting light at said second wavelength towards said opposite face of said etalon.

19. The system of claim 15, wherein said sensitized second lasant material is a Yb, Er:phosphate glass; wherein said etalon has a sub-millimeter thickness; and wherein said cavity means comprises a coating on said one face which is HR for said second wavelength, and a mirror which faces said opposite face and which is HR at said first wavelength and at said second wavelength.

20. The system of claim 19, wherein said one face carries a coating which is HT at said first wavelength and wherein said opposite face carries a coating which is HT at said second wavelength.

21. The system of claim 15, wherein said first optical cavity comprises a coating on said opposite face of said etalon for high reflection at said first wavelength; and wherein said cavity means comprises a coating on said one face of said etalon for high reflection at said second wavelength.

22. A solid state laser system, comprising:
a) a plano-convex and doped crystal which is selected from the group consisting of YAG, YVO$_4$ and YLF, which is located in a laser cavity, which emits laser light when pumped by a laser diode source, which has a flat face and an opposite convex face, and which is essentially transparent to light at a predetermined wavelength; and
b) output means for said laser cavity comprising a sensitized glass lasant material which is located in said laser cavity, which has a thickness to absorb said laser light from said convex face of said crystal for Optimum Output Coupling to said crystal, which has a thickness which is thin relative to the corresponding dimension of said plano-convex crystal, which emits laser light at said predetermined wavelength, which contains at least one rare earth element selected from the group consisting of Yb and Er, which has one face which is located adjacent to said crystal, and which has an opposite face, said flat face of said crystal and said opposite face of said glass being coated from high reflection of said laser light from said crystal, said convex face of said crystal and said one face of said glass being anti-reflection coated for said laser light from said crystal, said one face of said glass being coated for high reflection at said predetermined wavelength, and said opposite face of said glass being coated for reflection at said predetermined wavelength.

23. A laser system, comprising:
a) a laser source having an output at a first wavelength;
b) a laser cavity comprising
reflecting means for reflecting light at a second wavelength and at said first wavelength,
a sensitized glass lasant material which is located between said reflecting means and said laser source, which is sufficiently thick to absorb said laser light at said first wavelength for Optimum Output Coupling to said output of said laser source, which substantially functions as an output coupler for said laser source, which emits laser light at said second wavelength, which has one surface which faces said source, and which has an opposite surface which faces said reflecting means, and
means, adjacent to said source, for reflecting into said one surface of said lasant material light at said one wavelength and at said second wavelength; and
c) optical isolator means for receiving said output of said laser source and transmitting said output to said one surface of said lasant material and for isolating said laser source from said laser light at said second wavelength.

24. The laser system of claim 23, wherein said laser cavity includes means for moving said reflecting means towards and away from said opposite surface of said glass lasant material to achieve resonance in said laser cavity for light at said first wavelength.

25. The laser system of claim 23, wherein said laser source comprises Nd: YLF; wherein said lasant material is a Yb-Er glass; and wherein said output of said laser source is mode matched to said glass.

26. The laser system of claim 23, wherein said laser source is a laser diode; and wherein said laser cavity is resonant at said first wavelength.

27. A method for pumping a relatively weakly absorbing lasant material, comprising the steps of:
(a) selecting a first lasant material and a weakly absorbing second lasant material which have sufficiently low losses at a secondary laser wavelength and at a primary laser wavelength respectively, such that a net gain is achievable in each material;
(b) locating said first lasant material in a first laser cavity and producing laser light at said primary wavelength;
(c) locating said second lasant material to receive said laser light at said primary wavelength, and pumping said second lasant material with said laser light at said primary wavelength to produce laser light at said secondary wavelength; and
(d) adjusting the amount of said second lasant material to absorb light at said primary wavelength for Optimum Output Coupling to said light from said first lasant material, such that said second lasant material substantially functions as an output coupler for said first laser cavity.

28. The method of claim 27, where in step (c) said second lasant material is located in said first laser cavity; and wherein step (a) includes the step of selecting said first lasant material to be essentially transparent to light at said secondary wavelength.

29. The method of claim 27, where in step (c) said second lasant material is located in a second laser cavity and in said first laser cavity; and step (c) includes the steps of pumpingly coupling said second lasant material to said light at said primary wavelength, and substantially separating light at said secondary wavelength from light at said primary wavelength by using one of the polarization and the wavelength characteristics of light.

30. The method of claim 27, where in step (a) said second lasant material is selected to have low absorption losses due to excited state absorption at said primary laser wavelength.

31. The method of claim 27, where step (c) said second lasant material is located in said first laser cavity and in a second laser cavity.

32. A laser apparatus, comprising:
a) a first laser cavity which is resonant at a primary wavelength;
b) a first lasant material which is located in said first laser cavity to produce optical radiation at least at said primary laser wavelength; and
c) a second lasant material which is optically pumped by said optical radiation from said first lasant material, which absorbs optical radiation at said primary laser wavelength in an amount to achieve Optimum Output Coupling to said optical radiation from said first lasant material, which is at least partially located in said first laser cavity, which functions as the output coupler of said first laser cavity, and which lases at a secondary laser wavelength, wherein said first lasant material is selected to be essentially transparent at said secondary laser wavelength.

33. A laser apparatus, comprising:
a) a first laser cavity;
b) a first lasant material located in said first laser cavity to produce optical radiation at one or more primary laser wavelengths;
c) a second lasant material located in said first laser cavity and having a transmission of radiation at one of said primary optical wavelengths which is substantially equal to the reflectivity for Optimum Output Coupling for said first lasant material, said second lasant material when absorbing optical radiation at said one primary optical wavelength producing a population inversion in said second lasant material and optical gain at a secondary laser wavelength; and
d) a second laser cavity which is resonant at said secondary laser wavelength, and which has output coupling means for said secondary optical wavelength, said second lasant material being located in both said first laser cavity and said second laser cavity.

34. The apparatus of claim 33, wherein said first laser cavity and said second laser cavity are collinear.

35. The apparatus in claim 33, wherein laser light at said primary and said secondary laser wavelengths are collinear in said second lasant material; and in further including means for separating laser light at said primary and secondary laser wavelengths using polarization to have said first and said second laser cavities spatially distinct.

* * * * *